United States Patent [19]

Fennel et al.

[11] Patent Number: 5,058,699
[45] Date of Patent: Oct. 22, 1991

[54] PROCESS AND CIRCUIT CONFIGURATION FOR CONTROLLING A TSC-SYSTEM WITH BRAKE AND MOTOR MANAGEMENT

[75] Inventors: Helmut Fennel, Bad Soden; Hans Wupper, Friedrichsdorf; Gunther Buschmann, Griesheim; Lothar Keller, Bad Homburg; Rainer Klusemann, Frankfurt am Main, all of Fed. Rep. of Germany

[73] Assignee: Alfred Teves GmbH, Frankfurt, Fed. Rep. of Germany

[21] Appl. No.: 322,756

[22] Filed: Mar. 13, 1989

[30] Foreign Application Priority Data

Mar. 18, 1988 [DE] Fed. Rep. of Germany ....... 3809101

[51] Int. Cl.[5] .............................................. B60K 41/20
[52] U.S. Cl. .................................... 180/197; 303/110; 364/406.03
[58] Field of Search ......................... 180/197, 170, 177; 303/102, 110, 116, 119, 100; 364/426.01, 426.03, 426.02; 188/355, 356, 357, 358, 359, 360

[56] References Cited

U.S. PATENT DOCUMENTS

| 4,766,972 | 8/1988 | Takato et al. | 180/197 |
| 4,825,989 | 5/1989 | Frigger | 180/197 |
| 4,838,620 | 6/1989 | Sypniewski | 180/197 |

FOREIGN PATENT DOCUMENTS

| 3713374 | 10/1987 | Fed. Rep. of Germany . |
| 3619074 | 12/1987 | Fed. Rep. of Germany . |
| 3620386 | 12/1987 | Fed. Rep. of Germany . |
| 1007126 | 10/1965 | United Kingdom . |
| 2112090 | 7/1983 | United Kingdom . |
| 2191541 | 12/1987 | United Kingdom . |

*Primary Examiner*—Andres Kashnikow
*Assistant Examiner*—Richard Camby
*Attorney, Agent, or Firm*—Robert P. Seitter; J. Gordon Lewis

[57] ABSTRACT

For controlling a traction slip control system with brake and motor management, motor regulating signals (m) are derived from electrical signals indicative of the brake pressure or which influence the brake pressure. Preferably, a brake pressure pattern (p[t]) is formed taking into account the pressure build-up and pressure decrease characterics of the wheel brakes or of the entire system as a basis for computing the motor regulating signals (m).

7 Claims, 2 Drawing Sheets

PROCESS AND CIRCUIT CONFIGURATION FOR CONTROLLING A TSC-SYSTEM WITH BRAKE AND MOTOR MANAGEMENT

BACKGROUND OF THE INVENTION

The present invention relates to a process for controlling a traction slip control system with brake and motor management. The rotating pattern of the wheels is measured and brake pressure control signals and motor regulating signals, providing control signals are obtained from the measuring signals for a motor regulating element. The invention also relates to a circuit configuration for carrying out the process.

It is conventional in traction slip control to apply the wheel brake and/or to manage the control of the driving motor. Published German patent document DE-PS 1 27 301 describes a traction slip control means of the aforementioned type which is provided for automotive vehicles having an anti-locking system. As long as only one wheel tends to race, only the brake of that particular wheel that is applied. Once excessive traction slip occurs on more than one wheel, the torque of the driving motor is reduced by restoring the throttle valve. In special situations, as when predetermined threshold values of the automobile speed or of the longitudinal and/or transverse acceleration are exceeded, the torque-reducing management will be released if only one of the driven wheels tends to race. The rotating pattern of the driven wheels and of the traction slip, respectively, therefore serves as a regulating variable for the brake and motor management.

Published German patent document DE-OS 36 19 074 discloses a motor torque control within a traction slip control system wherein the pressure fed through the traction slip control system into the wheel brake of the wheel tending to race is used as the regulating variable for the torque control of the driving motor. For this purpose, the wheel brakes of the driven wheels, through pressure fluid conduits, are in communication with regulating cylinders the pistons of which, through a regulating element, act on the throttle valve of the driving motor or on the regulating rod of the injection pump. However, it is difficult to realize a precise traction slip control because phase shifts, delay and dead times between the adjusting and regulating variables are inevitable.

It is, therefore, an object of the present invention to overcome the disadvantages of these systems and to provide a traction slip control with brake and motor management which precludes overload of the brakes and which meters out the motor management such that start-up and acceleration of the automotive vehicle are not affected.

SUMMARY OF THE INVENTION

It has been found that this problem can be solved by improving a process of the aforedescribed type, a characteristic feature of which being that the motor regulating signals are derived from electrical signals indicative of the brake pressure or which influence and determine the brake pressure.

According to an advantageous embodiment of the present invention, the brake pressure is controlled with the aid of electromagnetically operated multi-way valves inserted into the pressure fluid conduits of a brake system, with the motor regulating signals being derived from the valve control signals. It is particularly advantageous, in the practice of the present invention, to form from the valve control signals, through integration, under consideration of the pressure build-up and pressure decrease characteristics of the wheel brakes or of the entire system, a brake pressure pattern indicative, by approximation, of the brake pressure in the wheel brakes, and to use the brake pressure pattern for respectively determining and computing the motor regulating signals.

A circuit configuration for carrying out the process including sensors for determining the wheel rotating pattern, and circuits for the signal processing and for the generation of regulating signals that can be supplied to electromagnetically operable multi-way valves provided in the pressure fluid conduits of a brake system, and to a motor regulating element is provided with circuits for driving the motor regulating element, to which a signal can be supplied, as an input variable which is, by approximation, indicative of the brake pressure. According to one embodiment, another input variable can be supplied to the circuits for driving the motor regulating element, which, in response to the wheel slip and the wheel acceleration, restores the motor regulating element into the initial position once the brake pressure has decreased below a threshold value.

The circuit configuration, advantageously, includes a circuit to form the pressure pattern arising from integration of the valve control signals of the pressure build-up and pressure decrease characteristics of the wheel brakes and of the entire system, respectively, and constituting the signal which is, by approximation, indicative of the brake pressure.

Provision also is made for the circuit to drive a throttle valve adjustable by electrical signals and serving as a motor regulating element.

In accordance with the invention, a control of the throttle valve and of a motor regulating element therefore is attained which is precisely adjusted to the brake pressure fed for controlling the traction slip into the wheel or wheels tending to race thereby enabling the brake management and, therefore wear and internal stress to kept as low as possible. No pressure sensor or the like is needed because, in a preferred embodiment of the present invention, a pressure pattern is formed indicating, by approximation, the wheel pressure and serving as a regulating variable.

BRIEF DESCRIPTION OF THE DRAWING

Further details, advantages and applications of the invention will become completely understood from the following description of one embodiment of the present invention when taken in conjunction with the accompanying drawing wherein.

DETAILED DESCRIPTION OF A PREFERRED EMBODIMENT

Figure 1:
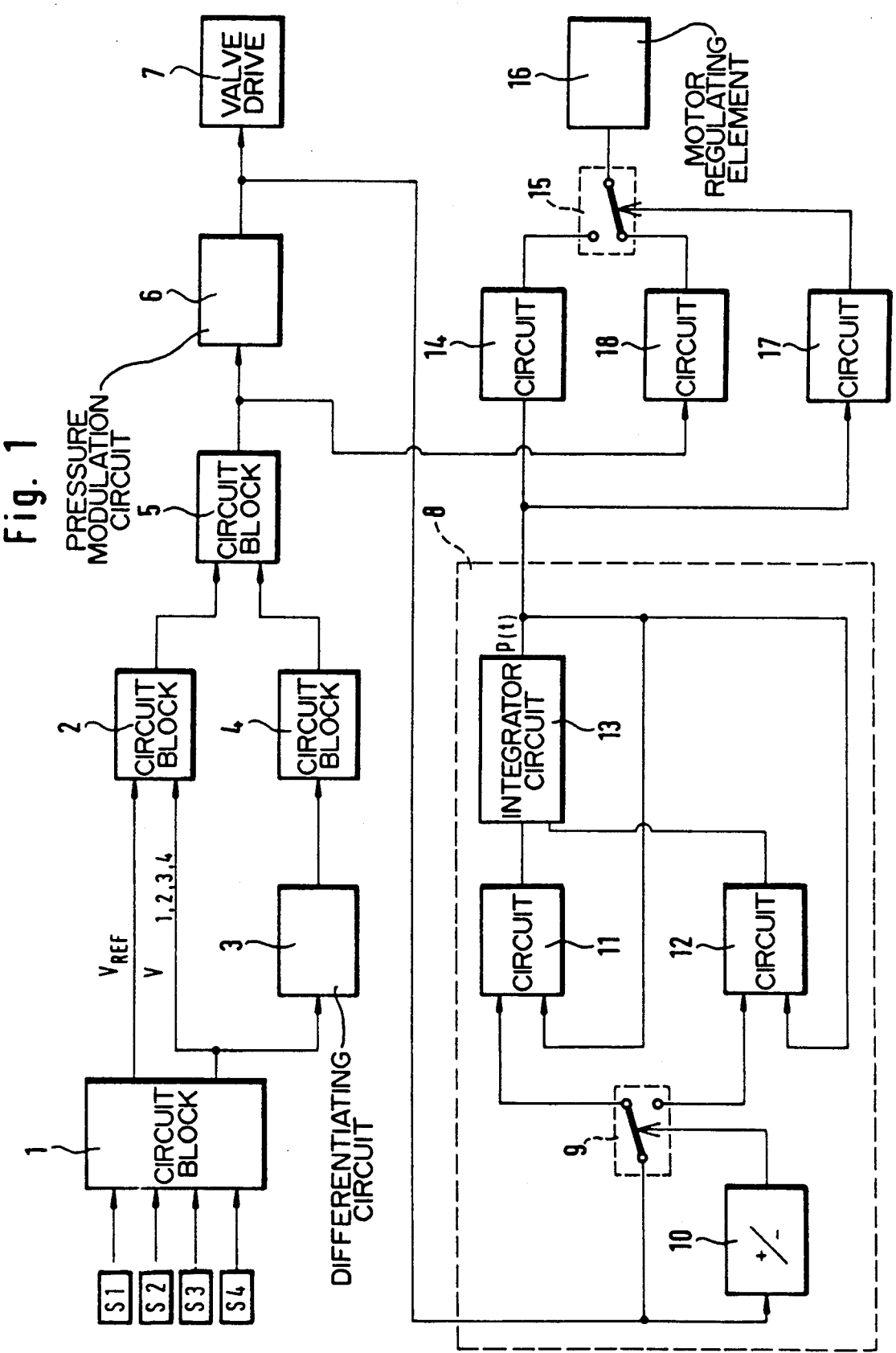
FIG. 1 is a block diagram of a circuit configuration according to the present invention; and, FIGS. 2 through 4 respectively show the versus time characteristics the wheel speed, the brake pressure in the same wheel and the angle of inclination of the throttle valve during a start-up and traction slip control operation.

According to FIG. 1, the signals obtained by way of the wheel sensors S1 to S4 and which are indicative of the rotating pattern of the individual vehicle wheels, are processed in circuit 1. The speed of the individual wheels v, wheel 1, 2, 3 and 4 and a vehicle reference speed V REF is determined in circuit block 1. In the next circuit block 2, the wheel slip is determined by comparing the individual wheel speed to the vehicle reference speed to determine whether the slip exceeds predetermined slip thresholds. As the present case is a traction slip control, the positive slip is of particular interest although in the event of temporary excessive deceleration, a negative slip and a brake slip, respectively, also could occur during the control.

In a differentiating step 3, the wheel acceleration is determined and subsequently compared, in circuit block 4, to predetermined acceleration threshold values. In circuit 5, the wheel slip and wheel acceleration values determined from steps and blocks 2 and 4, will be logically combined according to predetermined criteria to determine whether and to what extent pressure is to be built up, kept constant and re-decreased in the controlled wheel. In response to the output signal of step 5, a pressure modulation step 6 is driven. In the presently described embodiment, pressure fluid is fed into the wheel brake of the wheel to be controlled, thereby building up pressure once the output signal of step 5 is positive. If the output signal of step 5 is negative, this will result in a pressure decrease.

The pulse lengths and pulse breaks are dependent on the level of the output signal 5. Numeral 7 symbolizes the valve drive. In the circuit, depending on the output signal of step 6, pulse sequences predetermined pulse length/pulse break ratios and a predetermined pulse number during pressure build-up and pressure decreases phases are determined. The signals are finally boosted in circuit 7 and directly passed on to the brake pressure control valves provided in the pressure fluid conduits leading to the wheel brakes of the controlled wheels, by way of which the brake pressure from a pressure source is fed into the wheel brakes.

Moreover, the output signal of the pressure modulation step 6 serves to form a brake pressure model in conjunction with circuit 8 containing steps 9-13 combined therein. The valve driving signals or the corresponding output signals of the pressure modulation step 6, through a switch 9 the switching position of which, as symbolized by element 10, is sign-dependent, are fed to an integrator 13 either by way of a circuit 11 or a circuit 12. In circuit 11, the volume-pressure characteristic for the pressure build-up is reproduced, whereas in circuit 12, the characteristic for the pressure decrease is reproduced so that the characteristics are considered during the integration in circuit 13.

The output value of the circuits 11 and 12 is dependent on the pulse length and on the duration of the valve driving signals, respectively, and on the actual pressure level. A pressure increase results in a positive pressure differential value, while a pressure decrease results in a negative value. Integrator 13 adds up from subtracts from the preceding pressure level the pressure differential values and the output signals of the circuits 11 and 12, respectively.

The output signal p(t) of the integrator 13 and the pressure model, respectively, is connected to the input of a circuit 14 which, in a corresponding switch position of a switch 15, through a motor regulating element 16, generates throttle valve closure signals A2 for reducing the engine performance. In circuit 14, the system dead time also is considered when determining the throttle valve closure signals. If the actual output value p(t) of the brake pressure model 8 is zero or if it is below a predetermined threshold value, the switch 15, through circuit 17, is switched into the position as shown. In that switching position, throttle valve regulating pulses causing opening of the throttle valve and a rise in the driving motor moment, respectively, through a circuit 1B, are passed to the throttle valve drive and to the motor adjusting element 16, respectively.

Driving of the throttle valve or of a corresponding motor adjusting element, hence, causes a closure of the throttle valve and a reduction in the engine performance respectively, as long as the signal p(t) obtained by the brake pressure model 8 is greater than zero. If p(t)=0, through the output signal of the circuit 5, by way of the circuit 18 and the circuit 16, the engine performance is re-increased to the value predetermined by the driver through the gas pedal.

Figure 2:
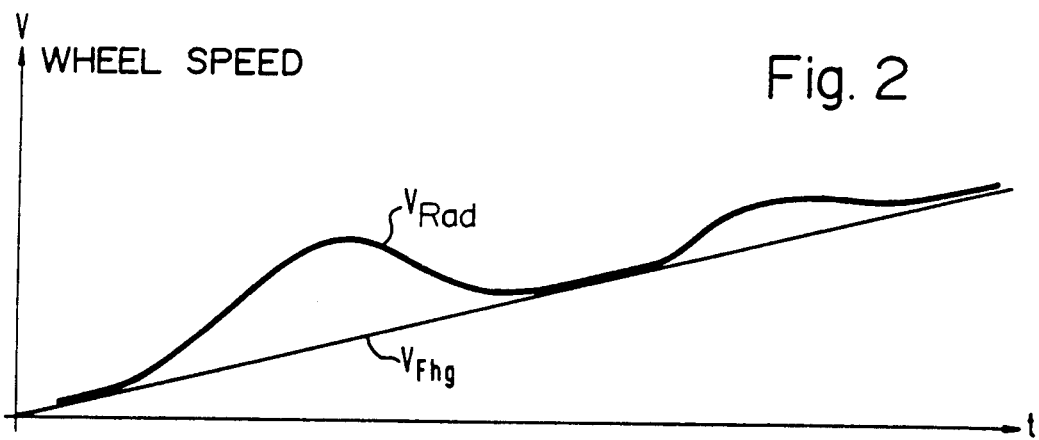
Figure 3:
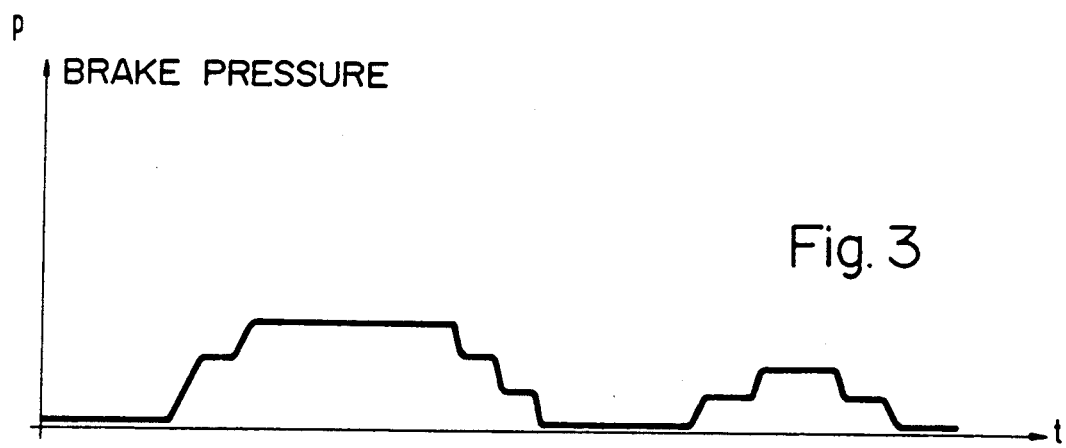
Figure 4:
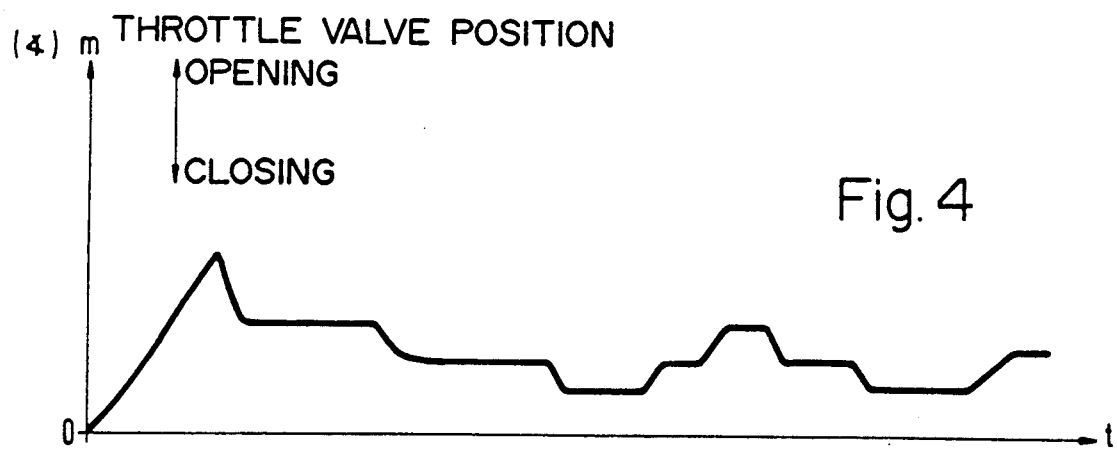

FIGS. 2 through 4 shows in a simplified illustration the wheel speed v during a traction slip control operation, the brake pressure p wheel during the said operation, and the position m or the angle of rotation of the throttle valve of the driving motor. A start-up operation with excessive traction performance is illustrated in FIGS. 2 through 4. The wheel speed. v wheel, therefore rises beyond the vehicle speed v Fhg, thereby commencing the slip control. First, the brake pressure is supplied which, however, will remain relatively low, and after a certain period of time, can be re-decreased because in the meanwhile, the motor traction moment has been reduced by closing the throttle valve. This early and precisely metered-out motor management precludes overload of the brake, permitting start-up of the vehicle with high acceleration. The acceleration, at sufficient engine performance, essentially will be determined by the maximum possible force-lock between the tire and road, dependent on the road conditions.

What is claimed is:

1. A process for controlling a traction slip control system of a brake system having rotating wheels, and with brake and motor management, said process comprising the steps of: measuring the rotating pattern of the wheels to provide measuring signals, obtaining from the measuring signals brake pressure control signals and motor regulating signals as control signals for a motor regulating element, and deriving the motor regulating signals from separate electrical signals respectively indicative of pressure build-up and pressure decrease brake pressure (P wheel) which electrical signals control the brake pressure and wherein a brake pressure pattern is formed from control signals by integration of the pressure build-up and pressure decrease characteristics of wheel brakes of the system and wherein said pattern is used for determining and computing the motor regulating signals.

2. A process according to claim 1, wherein the brake pressure (P wheel) is controlled with electromagnetically operable multi-way valves inserted into pressure fluid conduits of a brake system and responsive to valve control signals, and wherein the motor regulating signals are derived from the valve control signals.

3. A process for controlling a traction slip control system of a brake system having rotating wheels, and with brake and motor management, said process comprising the steps of: measuring the rotating pattern of the wheels to provide measuring signals, obtaining from the measuring signals brake pressure control signals and motor regulating signals as control signals for a motor regulating element, and deriving the motor regulating signals from separate electrical signals respectively indicative of pressure build-up and pressure decrease brake pressure (P wheel) which electrical signals control the brake pressure, wherein the brake pressure (P wheel) is controlled with electromagnetically operable multi-way valves inserted into pressure fluid conduits of a brake system and responsive to valve control signals, and wherein the motor regulating signals are derived from the valve control signals and wherein a brake pressure pattern is formed from the valve control signals by integration of the pressure built-up and pressure decrease characteristics of wheel brakes of the system, which brake pressure pattern indicates by approximation the brake pressure in the wheel brakes, and wherein the brake pressure pattern is used for determining and computing the motor regulating signals.

4. A circuit configuration for controlling a traction slip control system of a brake system having rotating wheels, said circuit configuration comprising sensors for determining the wheel rotating pattern, and circuits for processing of signals and for generating regulating signals that are supplied as valve control signals to electromagnetically operable multi-way valves provided in pressure fluid conduits of said brake system and to a motor regulating element, wherein circuits for driving the motor regulating element are provided to which a pressure pattern signal (p) is supplied as an input variable indicating by approximation prevailing brake pressure and means for deriving the pressure pattern signal (p) from separate ones of said valve control signals respectively indicative of pressure build-up and pressure decrease characteristics.

5. A circuit configuration according to claim 4, wherein in response to wheel slip and wheel acceleration another input variable restores the motor regulating element into its initial position once the brake pressure has decreased below a predetermined threshold value.

6. A circuit configuration according to claim 4, wherein the pressure pattern signal (p) is provided in response to the valve control signals by integration of the pressure build-up and pressure decrease characteristics of the wheel brakes and of the system, and which is indicative by approximation of the brake pressure.

7. A circuit configuration according to claim 4, wherein the circuit drives a throttle valve adjustable by electrical signals and providing said motor regulating element.

* * * * *